T. LEE.
Cooker and Steamer.

No. 213,763. Patented April 1, 1879.

Witnesses:
John A. Hughes
J. O. Christian

Inventor:
Thomas Lee
By J. J. Berbr
Atty

UNITED STATES PATENT OFFICE.

THOMAS LEE, OF CINCINNATI, OHIO.

IMPROVEMENT IN COOKER AND STEAMER.

Specification forming part of Letters Patent No. 213,763, dated April 1, 1879; application filed November 19, 1878.

*To all whom it may concern:*

Be it known that I, THOMAS LEE, of Cincinnati, in the county of Hamilton and State of Ohio, have invented a new and useful Improvement in Cooker and Steamer, which improvement is fully set forth in the following specification and accompanying drawings, in which—

Figure 1:
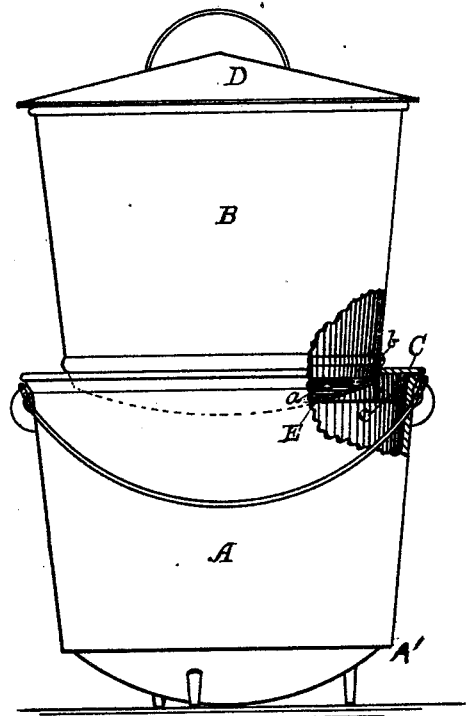
Figure 2:
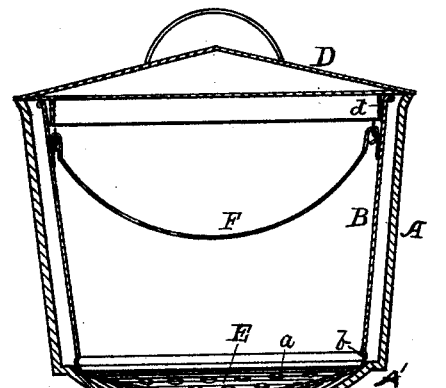
Figure 3:
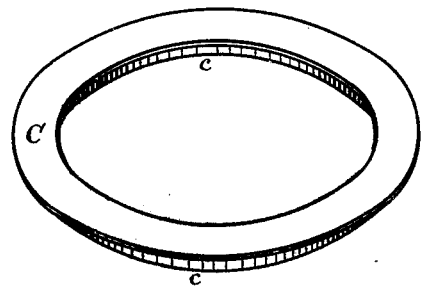

Figure 1 is a plain front elevation. Fig. 2 is a cross-sectional view, and Fig. 3 is a perspective view of the ring for the steamer.

The object of this invention is to provide a combination of a steamer or colander with a pot or cooker, in such a manner that it can be used either for steaming food; or as a strainer or tray into which the articles are to be placed preparatory to cooking, and which is provided with a bail and placed in a common pot.

In the accompanying drawings, A represents a common pot or cooker; B, the colander or steamer; C, a ring to be placed on the top of the cooker; and D is the lid, made of a proper size to fit either the steamer or the cooker.

The cooker A is made in the usual manner, and any design can be used for this purpose.

This invention relates particularly to the steamer B, of peculiar construction. The height of this vessel should be uniform with the outer vessel or pot, A, so that when the steamer B is placed down into the pot A the bead $b$ will rest on the ledge A', formed around the bottom of pot A, the object being to keep the heated portion of the water directly under the central portion of the heater as much as possible.

By this construction there are no flanges in the bottom of the outer vessel, A, as has been customary heretofore. It should be so constructed in size that it will fit into a cooker, as shown, a crease or bead, $b$, being formed around on its surface near the bottom.

The bottom E is slightly concave, and has a number of perforations, $a$, through it, so that the water or steam in the cooker can pass up through the same into the steamer B. An ordinary bail, F, is affixed to the inside of this vessel.

The lid D has an annular flange, $d$, on its lower surface, which can be used on the cooker, as shown in Fig. 2, or on the steamer, Fig. 1.

In Fig. 3, a ring, C, is shown, which has on its lower surface a flange, $c$. (Shown also in the cut-away part, Fig. 1.) The base of the steamer B being smaller than the mouth of the cooker, the ring C is placed on the cooker, and the steamer placed on the hole in the ring. When used as a steamer it is placed on top of the cooker, as shown in Fig. 1. When used for cooking purposes the ring C is removed, and it is placed down into the cooker, as shown in Fig. 2. In either case the lid D is used. The vegetables or meat to be cooked are then placed within the steamer B, and when it is desired to take them from the cooker the steamer B is taken out by means of the bail F, and the liquid drained from the contents through the perforations $a$.

I disclaim as my invention the ring C and perforated bottom E.

Having thus described my invention, what I claim as new, and desire to secure by Letters Patent, is—

The combination of the outer vessel, A, having the ledge A' and depressed bottom, with the inner vessel, B, having the bead $b$ and handle F, and the chambered cover D, substantially as shown, and for the purpose specified.

THOMAS LEE.

Witnesses:
 EDWIN C. COPPIN,
 BENJAMIN BILES.